(12) United States Patent
Diehl et al.

(10) Patent No.: US 9,110,709 B2
(45) Date of Patent: Aug. 18, 2015

(54) PRESERVING CHANGES TO A CONFIGURATION OF A RUNNING VIRTUAL MACHINE

(75) Inventors: Thorsten Diehl, Boeblingen (DE); Volker Sameske, Boeblingen (DE); Stefan Wild, Steinenbronn (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 95 days.

(21) Appl. No.: 13/297,549

(22) Filed: Nov. 16, 2011

(65) Prior Publication Data

US 2012/0151480 A1 Jun. 14, 2012

(30) Foreign Application Priority Data

Dec. 14, 2010 (EP) ..................................... 10194941

(51) Int. Cl.
G06F 9/455 (2006.01)
G06F 9/46 (2006.01)
G06F 9/445 (2006.01)

(52) U.S. Cl.
CPC ............ *G06F 9/461* (2013.01); *G06F 9/44505* (2013.01); *G06F 9/45558* (2013.01); *G06F 2009/45575* (2013.01)

(58) Field of Classification Search
CPC .................................................. G06F 9/45533
USPC .............................................................. 718/1
See application file for complete search history.

(56) References Cited

U.S. PATENT DOCUMENTS

| | | | |
|---|---|---|---|
| 8,301,686 B1 * | 10/2012 | Appajodu et al. ............ 709/201 |
| 8,533,710 B1 * | 9/2013 | Long et al. ........................ 718/1 |
| 2006/0184937 A1 * | 8/2006 | Abels et al. ....................... 718/1 |
| 2006/0265082 A1 * | 11/2006 | Meade et al. .............. 623/23.65 |
| 2007/0240161 A1 * | 10/2007 | Prabhakar et al. ............ 718/104 |
| 2010/0138829 A1 | 6/2010 | Hanquez et al. |
| 2010/0287544 A1 * | 11/2010 | Bradfield et al. ............. 717/172 |
| 2011/0197051 A1 * | 8/2011 | Mullin et al. ..................... 713/1 |
| 2011/0225275 A1 * | 9/2011 | Shah et al. .................... 709/223 |
| 2011/0246778 A1 * | 10/2011 | Duane .......................... 713/176 |
| 2011/0265082 A1 * | 10/2011 | Ashok et al. ....................... 718/1 |
| 2011/0296488 A1 * | 12/2011 | Dandekar et al. ................. 726/1 |
| 2012/0005673 A1 * | 1/2012 | Cervantes et al. ................ 718/1 |
| 2012/0240110 A1 * | 9/2012 | Breitgand et al. ................ 718/1 |

(Continued)

OTHER PUBLICATIONS

Chris Wolf, Erick M. Halter, Virtualization: From the Desktop to the Enterprise, 2005, chapter 1 and 7.*

(Continued)

*Primary Examiner* — Emerson Puente
*Assistant Examiner* — Charlie Sun
(74) *Attorney, Agent, or Firm* — William A. Kinnaman, Esq.; Kevin P. Radigan, Esq.; Heslin Rothenberg Farley & Mesiti P.C.

(57) ABSTRACT

A method is provided for preserving changes to a configuration of a running virtual machine. The method includes reading an initial configuration, starting the virtual machine under application of the initial configuration, modifying the configuration of the virtual machine during runtime, storing the modified configuration of the virtual machine during shutdown, and reading the modified configuration at re-start of the virtual machine and re-starting the virtual machine under application of the modified configuration.

11 Claims, 6 Drawing Sheets

(56) References Cited

U.S. PATENT DOCUMENTS

2013/0061227 A1     3/2013   Diehl et al.
2013/0152099 A1*   6/2013   Bass et al. .................... 718/103

OTHER PUBLICATIONS

Diehl et al., Office Action for U.S. Appl. No. 13/664,842, filed Oct. 31, 2012 (U.S. Patent Publication No. 2013/0061227 A1), dated Dec. 4, 2013 (30 pages).

Diehl et al., Office Action for U.S. Appl. No. 13/664,842, filed Oct. 31, 2012 (U.S. Patent Publication No. 2013/0061227 A1), dated Mar. 30, 2014 (26 pages).

Diehl et al., Office Action for U.S. Appl. No. 13/664,842, filed Oct. 31, 2012 (U.S. Patent Publication No. 2013/0061227 A1), dated Jul. 30, 2014 (27 pages).

Diehl et al., Office Action for U.S. Appl. No. 13/664,842, filed Oct. 31, 2012 (U.S. Patent Publication No. 2013/0061227 A1), dated Dec. 19, 2014 (34 pages).

* cited by examiner

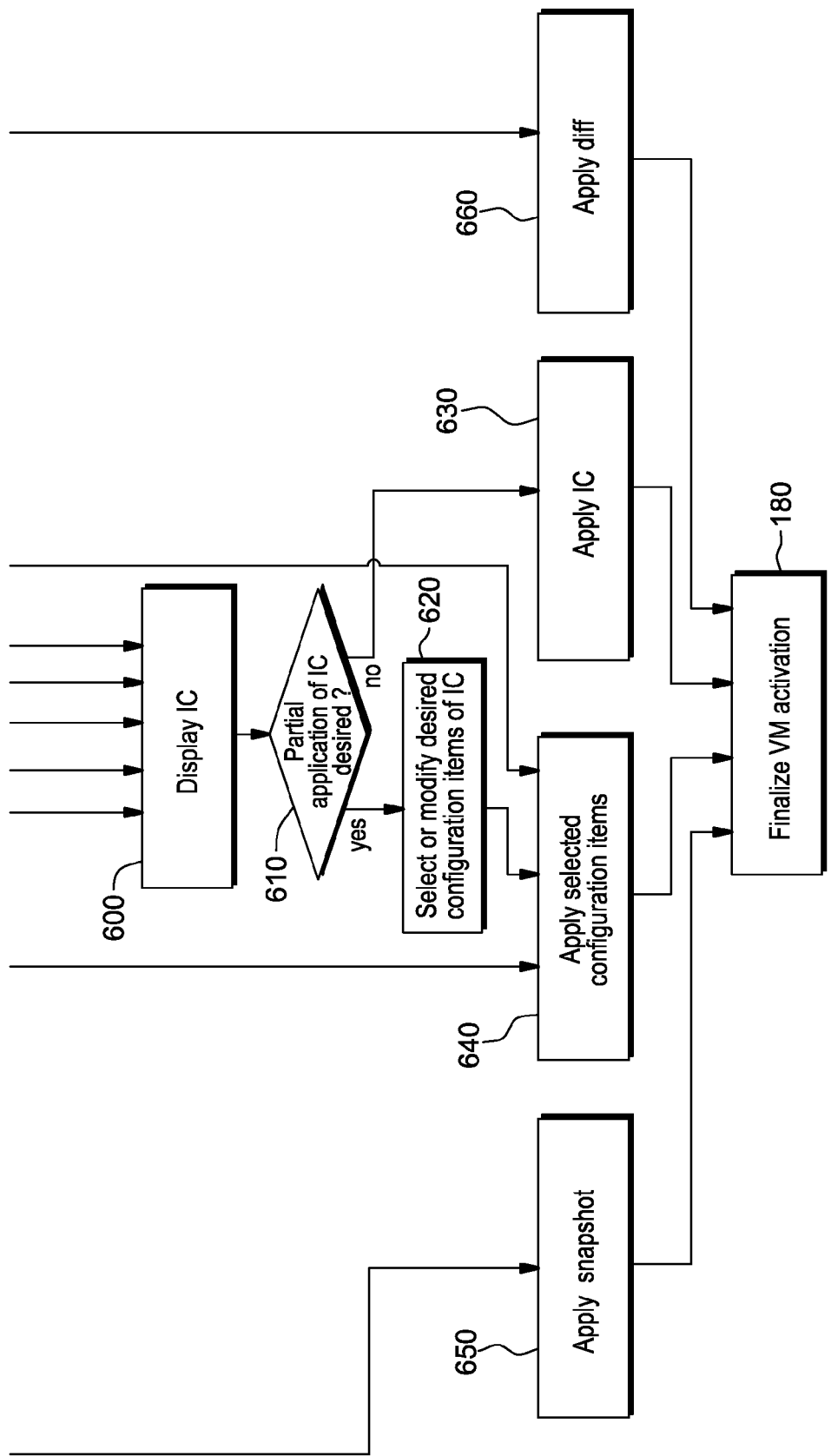

PRESERVING CHANGES TO A CONFIGURATION OF A RUNNING VIRTUAL MACHINE

PRIOR FOREIGN APPLICATION

This application claims priority from European patent application number 10194941.0, filed Dec. 14, 2010, which is hereby incorporated herein by reference in its entirety.

BACKGROUND

The present invention relates to a method for preserving changes to a configuration of a running virtual machine. The present invention further relates to a computer-readable medium such as a storage device, a floppy disk, CD, DVD, Blu-Ray disk, or a random access memory (RAM), containing a set of instruction that causes a computer to perform the above method. The present invention further relates to a computer program product comprising a computer usable medium including computer usable program code, wherein the computer usable program code is adopted to execute the above method.

Virtualization is becoming more and more important in IT systems, as it allows the use of central servers for performing different tasks as required by a user. This includes, that different operating systems can run on a single hardware environment, which offers high flexibility for the user. A virtual machine manager, also called hypervisor, is running on the hardware environment and provides an environment for execution of virtual machines, which are also called guests, for executing the each one operating system. The guests are virtual instances of operating systems, which are encapsulated inside the virtual machine manager and can be executed like running directly on the hardware environment. The hypervisor itself can be running directly on a hardware of a computer, which means without an underlying operating system, or as an application within a standard operating system like a Linux, Windows or others. Also virtual machine managers running on an intermediate instruction layer are known in the art.

Running a virtual machine on a hypervisor comprises the hypervisor providing a virtual environment comprising virtualized and virtual devices, as usually available as real hardware devices in the hardware environment. Accordingly, real hardware devices of the hardware environment have to be mapped to virtualized devices, so that they can be used by the virtual machine. In contrast, the pure virtual devices are not linked to any real hardware device. Depending on the requirements of a virtual machine or available resources, different configurations comprising virtual and virtualized devices can be provided for running a virtual machine. Also modifications on the hardware environment, e.g. by adding or removing devices, have to be adapted for the virtual environment. Furthermore, availability of virtual devices can be limited for performance reasons.

Accordingly, configuration of a virtual environment for a virtual machine is an important task for efficiently running the virtual machine and efficiently using the resources of the hypervisor. It is known in the art to provide and change a configuration of a virtual machine persistently only when the virtual machine is not running This makes configuration changes very time-consuming because the configuration can only be tested after starting the virtual machine. It is further known, e.g. from the U.S. Publication No. 2010/0138829A1 entitled "Systems and Methods for Optimizing Configuration of a Virtual Machine Running at Least One Process," Hanquez et al., published Jun. 3, 2010, which is hereby incorporated by reference herein in its entirety, to change a configuration of a virtual machine at runtime. Nevertheless, these changes are lost when the virtual machine is stopped. When restarting the virtual machine, the configuration changes have to be applied again, so that time is lost.

BRIEF SUMMARY

Provided herein, in one aspect, is a method for preserving changes to a configuration of a running virtual machine. The method includes: reading an initial configuration; starting the virtual machine under application of the initial configuration; modifying the configuration of the virtual machine during runtime; storing the modified configuration of the virtual machine during shutdown; and reading the modified configuration at restart of the virtual machine and restarting the virtual machine under application of the modified configuration.

In another aspect, a computer program product for preserving changes to a configuration of a running virtual machine is provided. The computer program product includes a computer-readable storage medium readable by a processor and storing executable instructions for execution by the processor for performing a method, the method comprising: reading an initial configuration; starting the virtual machine under application of the initial configuration; modifying the configuration of the virtual machine during runtime; storing the modified configuration of the virtual machine during shutdown; and reading the modified configuration to restart the virtual machine and restarting the virtual machine under application of the modified configuration.

BRIEF DESCRIPTION OF THE SEVERAL VIEWS OF THE DRAWINGS

Various embodiments of the invention are illustrated in the accompanied figures. These embodiments are merely exemplary, i.e. they are not intended to limit the content and scope of the appended claims.

FIG. 6 is a flowchart showing a second part of the startup phase of a virtual machine according to one or more aspects of the present invention.

DETAILED DESCRIPTION

Figure 1:
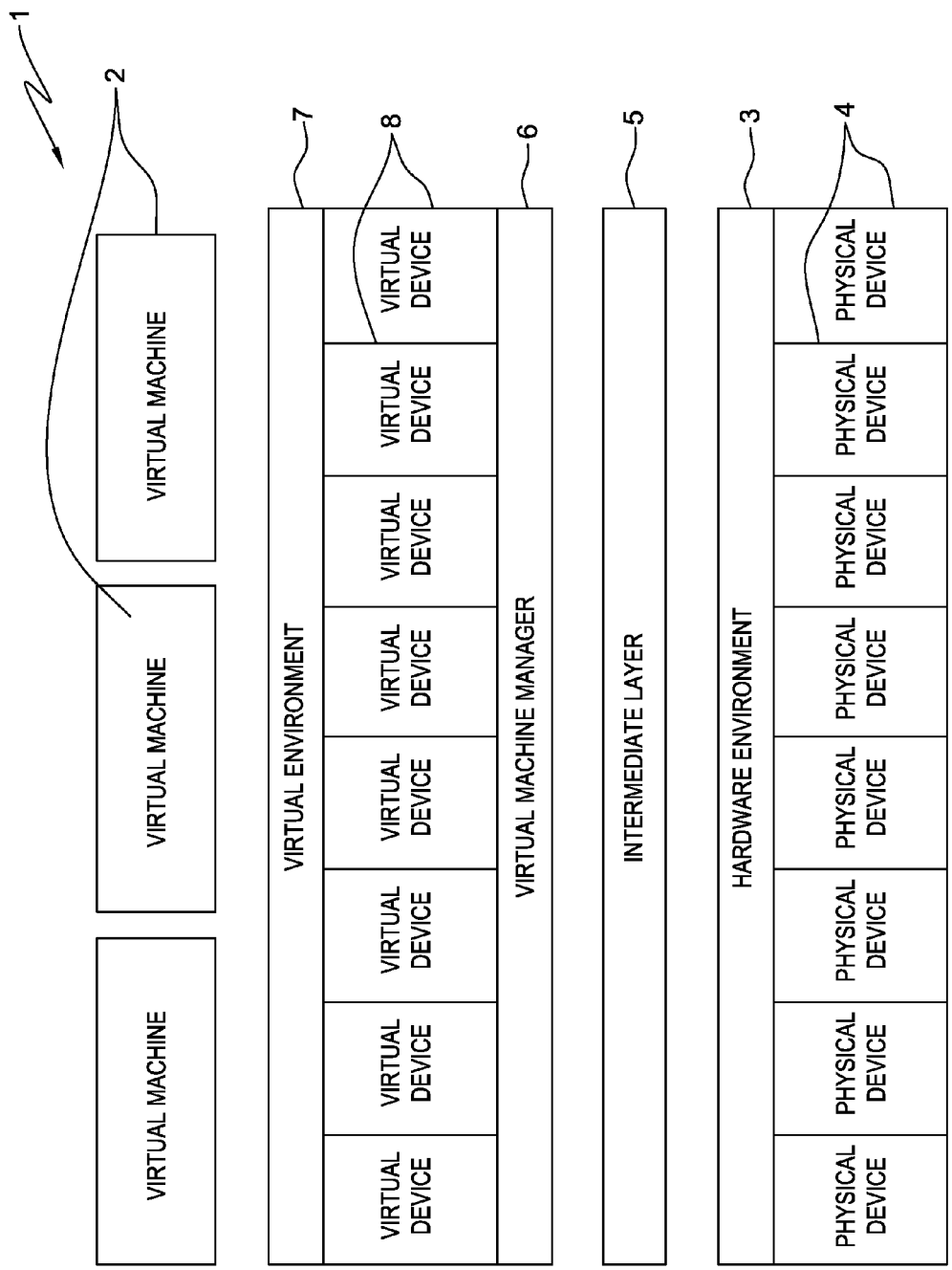
FIG. 1 shows a system comprising a hardware environment, a virtual environment and a set of virtual machines running thereon as a schematic diagram.

It is an object of the present invention to provide a method for preserving changes to a configuration of a running virtual machine, which is easy to use and allows an efficient configuration of the virtual machine.

This object is achieved by the independent claims. Advantageous embodiments are detailed in the dependent claims.

Accordingly, this object is achieved by a method for preserving changes to a configuration of a running virtual machine, the method comprising the steps of reading an initial configuration, starting the virtual machine under application of the initial configuration, modifying the configuration of the virtual machine during runtime, storing the modified configuration of the virtual machine during shutdown, and reading the modified configuration at re-start of the virtual machine and re-starting the virtual machine under application of the modified configuration.

The basic idea of the invention is therefore to store the configuration of a virtual machine, which has been modified during runtime of the virtual machine, when the virtual machine is shut down. The configuration is provided for startup of the virtual machine at a later time. This allows starting a virtual machine and configuring it adequately at runtime, which is a convenient way for providing a desired configuration of the virtual machine. The functionality of storing the configuration depends on the implementation of the virtual machine manager. Also dependent on the virtual machine manager, the configuration can be provided in different ways, e.g. a configuration file stored on a storage device of an underlying hardware of the virtual machine manager. The administrative effort compared to the state of the art is reduced, because it is not required to restart a virtual machine for applying configuration changes.

A modified embodiment of the present invention comprises the additional steps of modifying the configuration of the virtual machine during runtime after re-starting the virtual machine, storing the further modified configuration of the virtual machine, and reading the further modified configuration at re-start of the virtual machine and re-starting the virtual machine under application of the further modified configuration. This refers to the further modification of the configuration of the virtual machine, when already a modified configuration compared to the initial configuration has been applied when restarting the virtual machine. Configuration changes made at this stage are not lost but preserved for further use of the virtual machine.

In one embodiment of the present invention the step of storing the modified configuration of the virtual machine comprises storing the modified configuration as a snapshot. The snapshot is an image of the entire configuration, which can be applied to a virtual machine independently from any previous configuration. The snapshot can be stored as a physical copy of the entire configuration.

According to a modified embodiment of the present invention, the step of storing the modified configuration of the virtual machine comprises a set of configuration differences of the modified configuration compared to the initial configuration. The set of configuration differences is stored as a physical copy. The memory size of the modified configuration is small, since it is derived from the initial configuration and only stores the changes applied in respect to this configuration.

In another embodiment of the present invention, the step of storing the modified configuration of the virtual machine comprises storing the modified configuration on a data storage device. The data storage device can be any kind of device including a hard disk drive, a compact disk, a digital versatile disk, a tape, an optical disk drive, a flash RAM or other kinds of data storage devices. The advantage is that the configuration can easily be restored for further use and even be transported, e.g. for the use in other virtual machines.

A further embodiment of the present invention comprises the step of selecting the configuration to be applied when re-starting the virtual machine from the initial configuration and available modified configurations. The available configurations can be displayed to the user, so that he can easily choose between them, which increases the flexibility of the configuration for the virtual machine. Depending on the requirements of the user, the virtual machine can be started with the most suitable configuration from the available configurations.

In a further modified embodiment of the present invention a configuration comprises individual configuration elements and the step of selecting the configuration to be applied comprises removing or modifying at least one individual configuration element of the selected configuration and/or adding an individual configuration element of at least one not selected configuration. The selected configuration can be chosen individually from any of the available configurations including the initial configuration. Then individual configuration elements can be removed or modified compared to the chosen configuration. Also configuration elements can be applied from any available configuration, which has not been selected, and be combined to the selected configuration. The resulting modified configuration can then be applied to the virtual machine during activation. The individual configuration elements can comprise any kind of devices, e.g. physical storage devices or communication interfaces. Configuration elements can also comprise multiple devices. Furthermore, configuration elements comprising groups of device or individual devices can be defined independently, e.g. one configuration element comprising all storage devices and an individual configuration element for each interface. The configuration elements can be displayed to the user as a part of the respective modified or initial configuration when starting the virtual machine, so that the user can easily select from the available configuration. They can also be displayed individually.

In one embodiment, the present invention comprises the step of storing the configuration as provided according to the above method. The modified configuration can be stored after being finalized, i.e. before the activation of the virtual machine is finished, or a flag can be set for indicating that the selected configuration has to be stored later, e.g. when the virtual machine is shut down.

According to a further embodiment of the present invention the step of storing the modified configuration of the virtual machine comprises verifying a system setting and storing the modified configuration in case indicated by the system setting. This system setting allows defining, if changes to the configuration shall be preserved. For example when setting up a virtual machine, configuration changes can be allowed until a desired configuration has been finally tested or just until a certain point of time, e.g. a start-up phase of a virtual machine. On the other hand, configuration changes can be permitted, e.g. until a suitable and stable configuration has been achieved. When the system setting is deactivated, configuration changes can be applied, but are not preserved when restarting the virtual machine. Accordingly, a user of the virtual machine can modify the configuration up to his particular requirements without creating an impact on other users, which use the identical virtual machine. Also further enhancements on the configuration can first be tested, before they are stored and provided for restarting the virtual machine.

In a modified embodiment of the present invention, the step of selecting the configuration to be applied when re-starting the virtual machine comprises verifying a system setting and selecting the configuration to be applied when re-starting the virtual machine in case indicated by the system setting. Similar to the above described behavior, it is also possible that the virtual machine can be started either with the initial configuration or a modified configuration, e.g. when a modified configuration turns out to be erroneous and does not allow reliably running the virtual machine. Nevertheless, the initial configuration can be restored for further use.

The above system settings can be implemented individually or in a global way, so that one system setting modifies the behavior for storing the modified configuration and selecting the configuration to be applied. Furthermore, the system settings can be made by a user of the virtual machine, or can be depending on a global setting of the underlying virtual machine manager, which can accordingly also be modified by a user. The system settings can further be changed by external software, e.g. administration software, which monitors and administers multiple virtual machine managers.

A modified embodiment of the present invention comprises the step of modifying the system setting at runtime of the virtual machine. This refers to any of the afore-mentioned system settings. E.g. when a user wants to preserve a modified configuration or not, he only has to set the corresponding system setting accordingly at any time. Also the possibility of re-starting the virtual machine with the modified configuration or the initial configuration can be selected by the system setting at any time. This offers a high grade of flexibility when handling the configurations, especially during a set-up phase of a virtual machine.

According to a modified embodiment of the present invention the step of modifying the system setting comprises verifying an authorization to modify the system setting. This allows defining users, which have the task of modifying the configuration of a virtual machine. These users can be specifically skilled persons, e.g. system administrators, so that the modified configuration is assumed to be suitable and reliable. This refers to any of the afore-mentioned system settings.

A further modified embodiment of the present invention comprises the step of defining a modified configuration as the initial configuration. Accordingly, when a configuration turns out to be more suitable than the initial configuration, the modified configuration is provided as initial configuration for all users. This definition can be made by a system setting and be restricted as described above to the verification of an authorization of the user.

The object of the present invention is further achieved by a computer-readable medium such as a storage device, a floppy disk, compact disc, CD, digital versatile disc, DVD, Blu-ray disc, or a random access memory, RAM, containing a set of instructions that causes a computer to perform a method as specified above.

The object of the present invention is also achieved by a computer program product comprising a computer-usable medium including computer-usable program code, wherein the computer-usable program code is adopted to execute the above method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a system 1 running a set of virtual machines 2 can be seen. The system 1 comprises a hardware environment 3, which is formed by a set of physical devices 4. Physical devices can be any kind of devices as known in IT architectures, e.g. storage devices, interfaces, drivers or others. On top of the hardware environment 3 an intermediate layer 5, which is responsible for detecting changes in the current hardware environment 3. This intermediate layer 5 can e.g. be a BIOS, which provides an abstract interface through a hardware abstraction layer to the physical devices 4.

On top of the intermediate layer 5 is running a virtual machine manager 6, which is also called hypervisor. The hypervisor 6 provides a virtual environment 7 comprising a set of virtual devices 8. The virtual devices 8 comprise virtualized real devices, which are connected to at least one of the physical devices 4 of the hardware environment 3, and fully virtual devices, which are not backed up by any of the physical devices 4.

On top of the virtual environment 7 are running the virtual machines 2, which have each an operating system. The operating system of the virtual machine 2 can be chosen individually and makes use of the virtual environment 7 provided by the hypervisor 6. During runtime of a virtual machine 2, the configuration of the virtual environment 7 can be changed, which means any kind of virtual device 8 can be added or removed from the virtual environment 7. This configuration change is initiated only by the virtual machine 2 and applied by the hypervisor 6.

Figure 2:
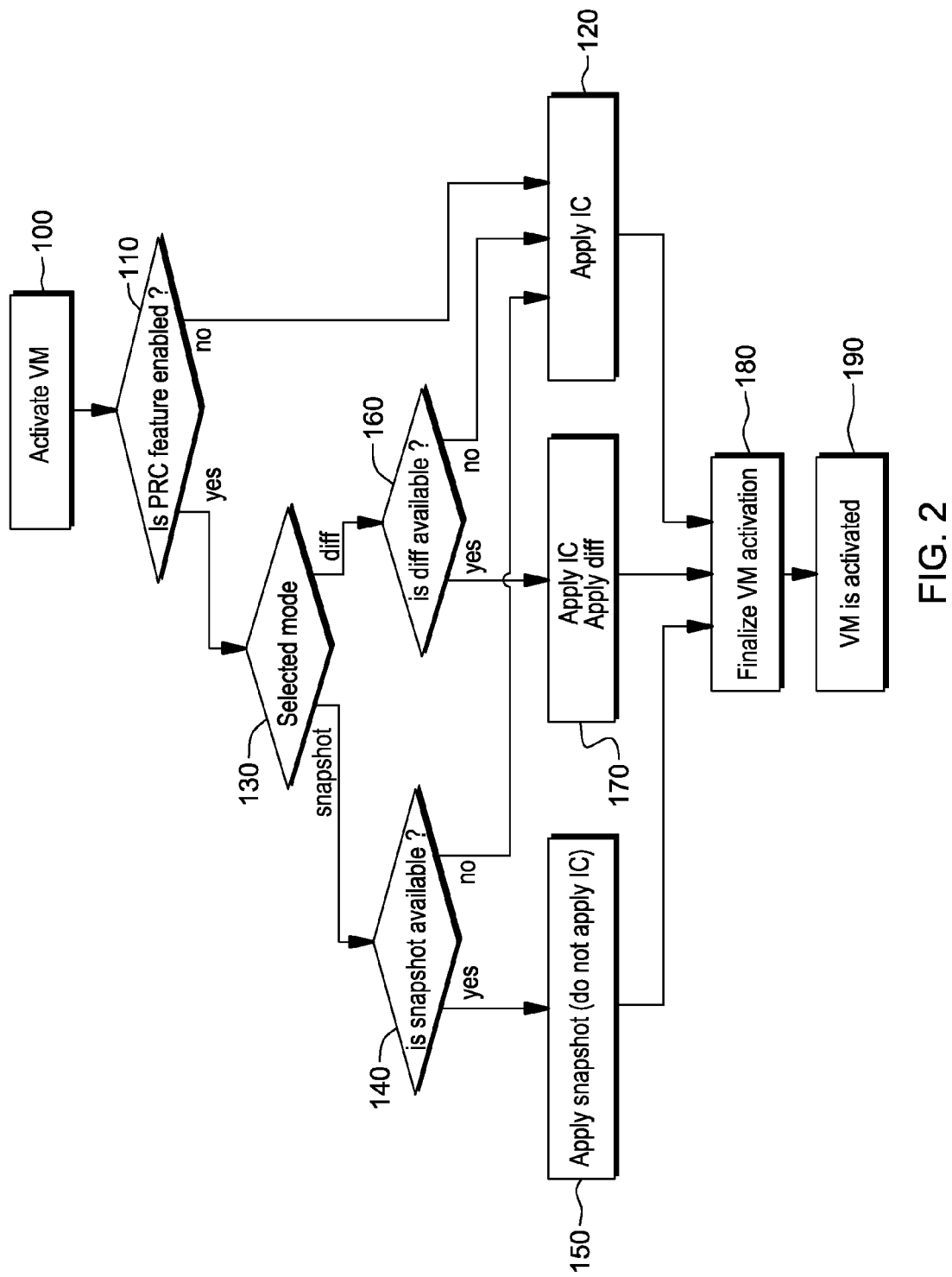
FIG. 2 is a flowchart showing the start-up phase of a virtual machine according to one or more aspects of the present invention.
Figure 3:
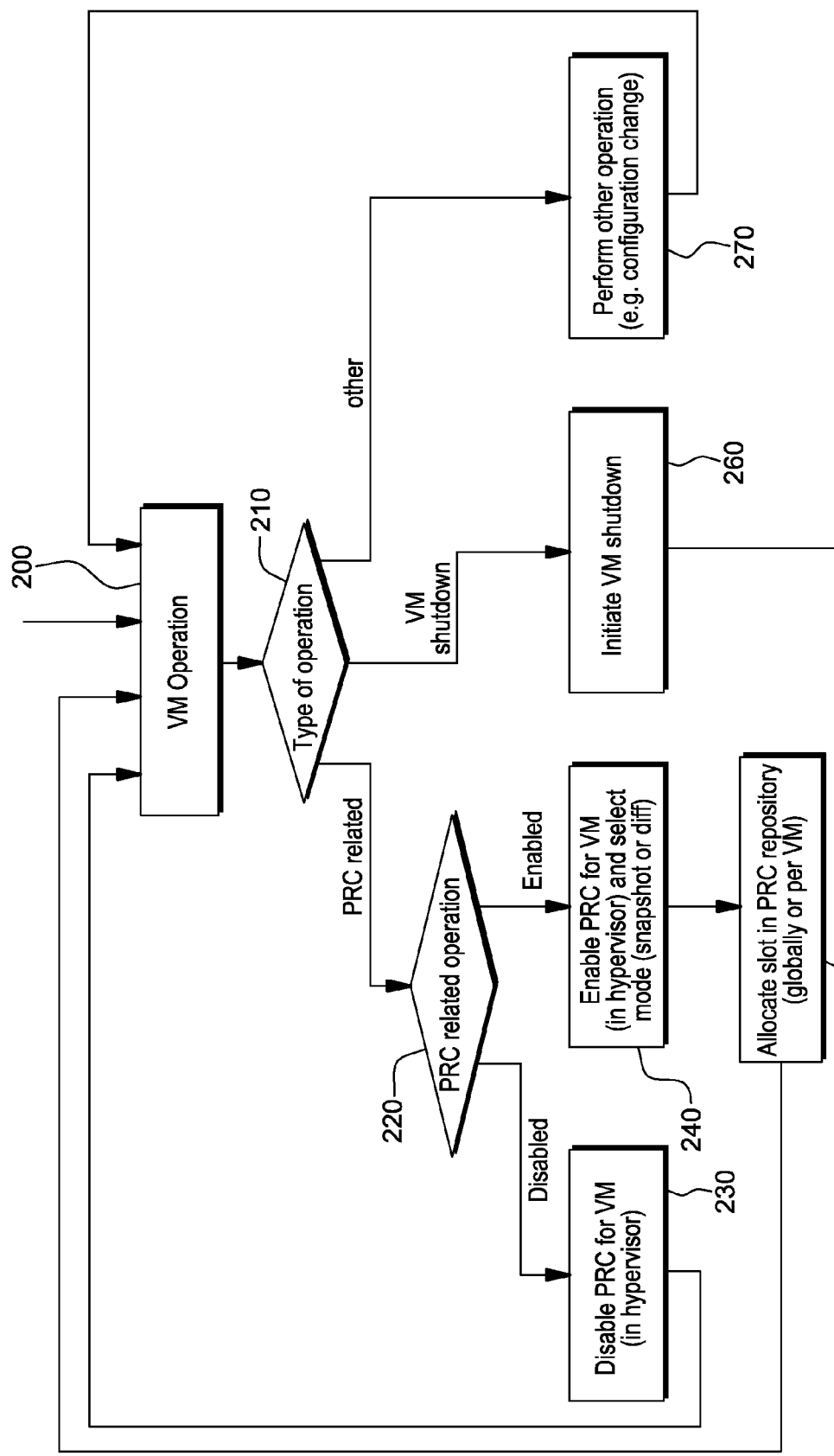
FIG. 3 is a flowchart showing the behavior when operating the virtual machine at runtime according to one or more aspects of the present invention.
Figure 4:
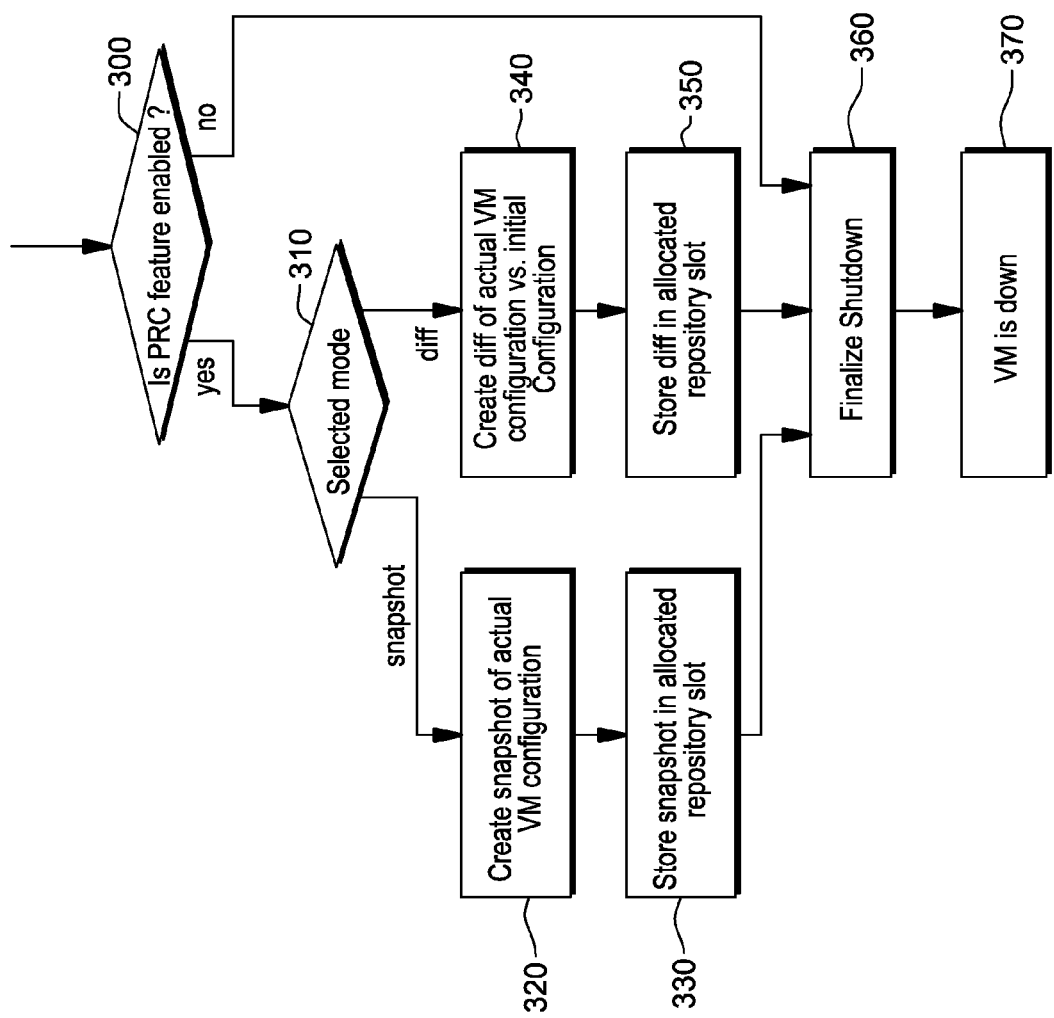
FIG. 4 is a flowchart showing the shutdown phase of a virtual machine according to one or more aspects of the present invention.

Referring now to FIGS. 2 to 4, a method according to a first embodiment of the present invention can be seen. The flowchart illustrates the behavior of a virtual machine 2 from a startup phase to the shutdown.

According to FIG. 2, in step 100 activation of the virtual machine 2 is started. The virtual machine 2 comprises a system setting, which is a flag denoted "persistent runtime configuration" (PRC).

In step 110, the hypervisor 6 verifies if the PRC setting is activated. If not, in step 120 an initial configuration of the virtual machine 2 is applied and the method continues with step 180. If the feature is enabled, the method continues with step 130.

In step 130, the hypervisor 6 evaluates which PRC mode has been selected. The selected mode can either be snapshot mode or diff mode. The mode refers to the way a modified configuration of the virtual machine 2 is stored. In snapshot mode, the modified configuration is stored entirely as an image, which can be applied to a virtual machine independently from any previous configuration. The snapshot is stored as an entire physical copy of the modified configuration. In diff mode, only configuration changes in respect to the initial configuration are stored when the virtual machine is deactivated. In both cases, physical storage space, also referred to as a slot, holds the modified configuration.

If the evaluation in step 130 determines snapshot mode as selected mode, in step 140 it is verified, if a stored snapshot is available. If no snapshot is available, which means that only the initial configuration exists, the method continues with step 120 applying the initial configuration as described above. If a snapshot is available, the method continues with step 150.

In step 150, the configuration stored in the snapshot is applied to the virtual machine 2. The configuration contained in the initial configuration is not applied. The method then continues with step 180.

If the evaluation in step 130 determines diff mode as selected mode, the hypervisor 6 verifies in step 160, if a stored configuration difference is available. If not, the method continues applying the initial configuration in step 120 as described above. If a configuration difference is available, the method continues with step 170.

In step 170, the modified configuration of the virtual machine 2 based on the configuration difference is applied. This comprises applying first the initial configuration of the virtual machine 2 and afterwards applying the configuration according to the stored configuration differences.

In step 180, the activation of the virtual machine 2 is finalized independently from the kind of the applied configuration.

In step 190, the virtual machine 2 is activated, i.e. it starts running in the virtual environment 7 provided by the hypervisor 6.

In step 200, the virtual machine 2 has entered into operation mode and is being used by the user according to his particular requirements. This use is not part of the diagram as shown in FIG. 3.

In step 210, it is verified, which kind of operation is to be executed. In case a PRC related operation is to be executed, the method continues with step 220. In case the operation is a shutdown of the virtual machine 2, the method continues with step 260. In case another type of operation is to be executed the method continues with step 270.

According to step 220, it is verified, which kind of PRC related operation is to be executed. This can be disabling the PRC feature, which is then realized in step 230, after which the method continues with the normal operation mode of the virtual machine 2 in step 200.

If the PRC related operation of step 220 is to enable PRC mode, the method continues with step 240. In this step, the PRC mode for the virtual machine 2 is enabled by setting the PRC flag in the hypervisor 6. Also the selected mode, which is snapshot or diff mode, is selected and stored in the settings.

In step 250, a memory area for storing the modified configuration is allocated in a PRC repository, which can be global or individual for each virtual machine 2. The PRC repository is stored on a storage device, which is not shown in the figures. The method then continues with the operation of the virtual machine 2 in step 200.

In step 260, a shutdown of the virtual machine 2 is initiated. The method then continues with step 300, as shown on FIG. 4.

If the type of operation of step 210 is another operation, this operation is performed in step 270. This operation can be for example a system query or a logical reset of a virtual device. It can also be a change to the current configuration, which was applied to the virtual machine 2 at startup, resulting in a modified configuration of the virtual machine 2. The method then continues with step 200 and the normal operation of the virtual machine 2.

Now referring to FIG. 4, in step 300 is verified, if the PRC feature is enabled. If the PRC feature is not enabled, the method continues with step 360, otherwise it continues with step 310.

In step 310, it is verified, which mode for storing the modified configuration is selected. In case the selected mode is snapshot mode, the method continues with step 320, in case diff mode is selected, it continues with step 340.

According to step 320, a snapshot of the current configuration of the virtual machine 2 is created as indicated above.

In step 330, the created snapshot is stored in the allocated slot in the PRC repository, i.e. the snapshot is stored on the storage device. The method then continues with step 360.

In step 340, which refers to the diff mode, the current configuration of the virtual machine 2 is stored as a configuration difference compared to the configuration at startup, i.e. the initial configuration. Accordingly, the configuration differences have to be determined and form a set of configuration differences.

In step 350, the configuration difference of the virtual machine 2 is stored in the allocated slot in the PRC repository. The configuration difference is accordingly stored physically on a storage device.

In step 360, the shutdown of the virtual machine 2 is finalized, until in step 370 the virtual machine 2 is down.

Figure 5:
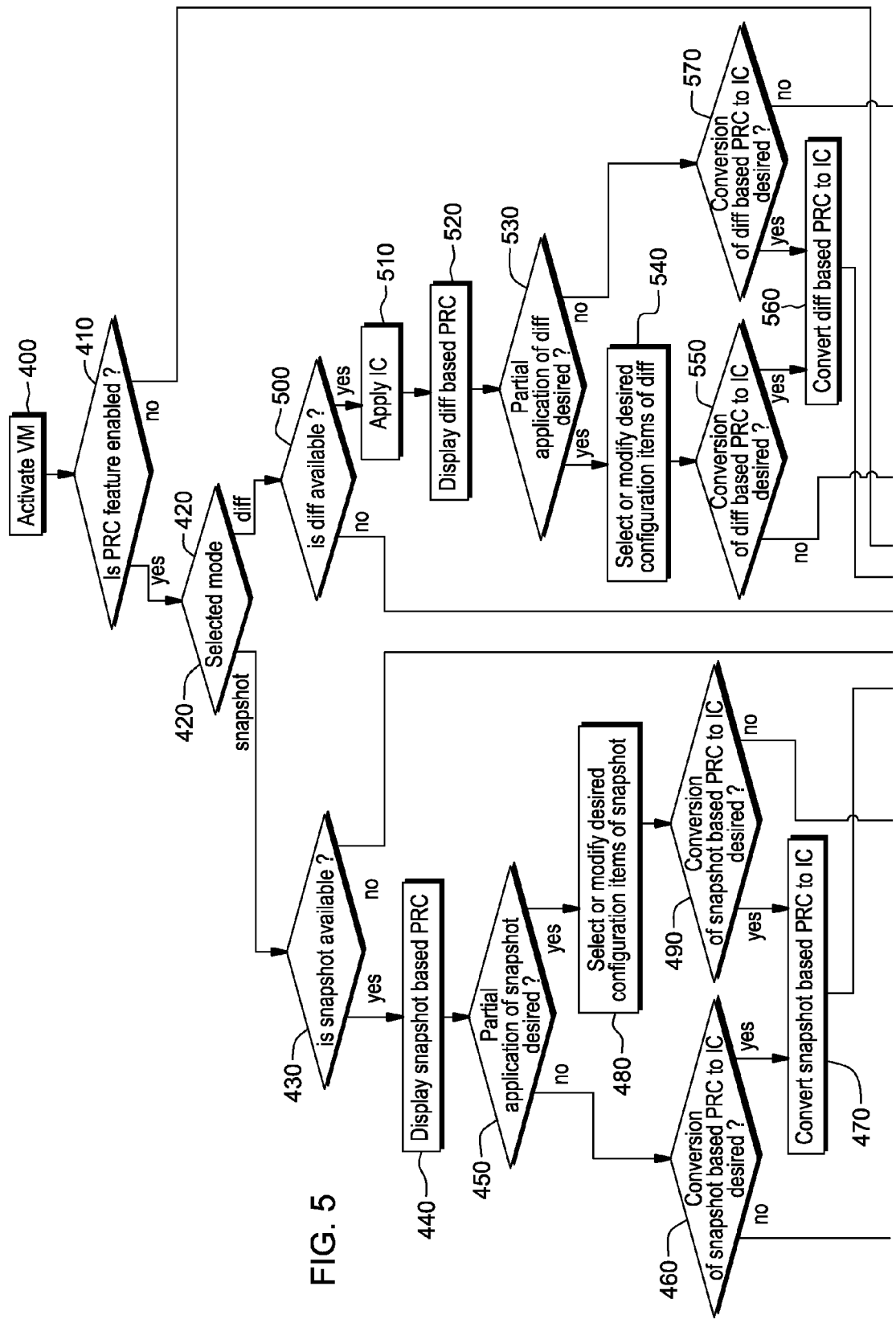
FIG. 5 is a flowchart showing a first part of the startup phase of a virtual machine according to one or more aspects of the present invention.

According to a second embodiment of the present invention, which is shown in FIGS. 5 and 6, the startup phase of the virtual machine as shown on FIG. 2 in respect to the first embodiment of the present invention, is modified. The remaining part of the flow diagram is identical to the one of the first embodiment and therefore not repeated.

In step 400, the activation of the virtual machine 2 is started. In step 410, the hypervisor 6 evaluates if the PRC feature is enabled. If not, the method continues with step 600, otherwise with step 420.

In step 420, it is evaluated which mode is selected according to step 130 of the first embodiment. If the selected mode is diff, the method continues with step 500, otherwise with step 430.

In step 430, it is verified if a snapshot is available. If not, the method continues with step 600, otherwise with step 440.

In step 440, the available snapshots are displayed to a user. The snapshots are taken from the PRC repository according to availability. Displaying the snapshots comprises displaying individual information elements as predefined. This implies displaying single devices or groups of devices as information elements. The configuration elements can be displayed immediately to facilitate the selection of the desired configuration by the user, or can be displayed upon request by the user. Also information elements can be displayed depending on properties of information elements, e.g. only individual information elements or only groups of configuration elements forming higher level configuration elements.

According to step 450, the user is requested to specify, whether a partial application of the selected snapshot is desired. If not, the method continues with step 460, otherwise it continues with step 480.

In step 460, the user is requested whether the selected snapshot of the modified configuration shall be converted into the initial configuration. If not, the method continues with step 650, otherwise it continues with step 470.

In step 470, the selected snapshot is converted into the initial configuration based on the modified configuration stored in the PRC repository. This comprises re-considering the presence of further modified configurations, available as configuration differences, which are based on the initial configuration. Accordingly, the available configuration differences have to be evaluated regarding the impact of the modification of the initial configuration and have to be updated, so that the set of configuration elements available in the configuration difference provides an identical configuration compared to the former initial configuration. The method then continues with step 600.

According to step 480, the user can select or modify desired configuration elements, also referred to as items in the figures, of the snapshot.

In step 490, the user is in accordance with step 460 requested, whether the resulting configuration of step 480 shall be converted into the initial configuration. In case this conversion is desired, the method continues with step 470 as already described. Otherwise the method continues with step 640.

In step 500, it is evaluated, whether a configuration difference is available. If not, the method continues with step 600, otherwise with step 510, where the initial configuration is applied.

In step 520, the configuration differences based on available stored configuration differences from the PRC repository are displayed to the user. The user then selects whether a partial application of the configuration difference is desired.

In step 530, it is verified, whether the user wants to apply only parts of the configuration difference. If yes, the method continues with step 540, otherwise it continues with step 570.

In step 540, the user can select or modify configuration elements of the configuration difference.

In step 550, the user is requested, whether the resulting configuration of step 540 shall be converted into the initial configuration. If not, the method continues with step 640, if yes the method continues with step 560.

In step 560, the current modified configuration of the virtual machine 2 is converted into the initial configuration based on the configuration difference stored in the PRC repository and the applied changes. In accordance with step 470, when converting the modified configuration into the initial configuration, the further configuration differences are considered to be updated depending on the changes made to the initial configuration.

In step 570, the user has to specify, whether a conversion of the configuration difference to the initial configuration, based on the PRC is desired. If yes, the method continues with step 560, otherwise the method continues with step 660.

In step 600, the initial configuration is displayed to the user.

In step 610, the user is requested, whether a partial application of the initial configuration is desired. This refers to applying only a subset of configuration elements of the initial configuration to the configuration of the virtual machine 2, so that the selected configuration is a subset of the configuration available from the initial configuration, or modifying configuration elements of the initial configuration. If yes, the selection is made in step 620, comprising possible modifications of configuration elements. If not, the method continues with step 630.

In step 630, the initial configuration is applied as configuration of the virtual machine 2.

In step 640, the selected configuration elements are applied as configuration of the virtual machine 2.

In step 650, the snapshot is applied as configuration of the virtual machine 2.

In step 660, the configuration difference is applied as configuration of the virtual machine 2, which comprises applying first the initial configuration as already done in step 510, and furthermore applying the configuration differences as stored in the PRC repository.

After finishing the step 630, 640, 650, or 660, the method continues with step 180 as described with respect to the first embodiment of the present invention.

Although in this embodiment the method comprises storing a modified configuration in a snapshot or in a configuration difference, an implementation of the inventive method can also be based on the use of either a snapshot or a configuration difference. This applies to the first embodiment as well as to the second embodiment of the present invention. The alternative presence of snapshot and configuration difference is described here for demonstration purposes without limiting the scope of the present invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been illustrated and described in detail in the drawings and fore-going description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

What is claimed is:

1. A computer program product for preserving changes to a configuration of a running virtual machine, the computer program product comprising:
a non-transitory computer-readable storage medium readable by a processor and storing executable instructions for execution by the processor for performing a method, the method comprising:
reading an initial configuration;
starting a virtual machine under application of the initial configuration,
modifying the initial configuration of the virtual machine during runtime to create a modified configuration, by applying a configuration change to the virtual machine during runtime, wherein the configuration change is initiated by the virtual machine during runtime and the modified configuration is retained in a storage space;
modifying a persistent runtime configuration setting at a time during runtime by one of: enabling the persistent runtime configuration setting or disabling the persistent runtime configuration setting;
checking whether the persistent runtime configuration setting is enabled and whether the modified configuration is available from the storage space;
responsive to the checking determining that the persistent runtime configuration setting is enabled and determining that the modified configuration is available from the storage space, storing, in place of the initial configuration, the modified configuration of the virtual machine, during shutdown, wherein the modified configuration is different than the initial configuration, reading the modified configuration at re-start of the virtual machine, and re-starting the virtual machine under application of the modified configuration;
responsive to the checking determining that the persistent runtime configuration setting is enabled and determining that the modified configuration is not available from the storage space, reading the initial configuration at re-start of the virtual machine and re-starting the virtual machine under application of the initial configuration; and
responsive to the checking determining that the persistent runtime configuration setting is disabled, reading the initial configuration at re-start of the virtual machine and re-starting the virtual machine under application of the initial configuration.

2. The computer program product of claim 1, further comprising:
further modifying the configuration of the virtual machine during runtime after re-starting the virtual machine,
storing the further modified configuration of the virtual machine during shutdown, and
reading the further modified configuration at re-start of the virtual machine and re-starting the virtual machine under application of the further modified configuration.

3. The computer program product of claim 1, wherein the storing, in place of the initial configuration, the modified configuration of the virtual machine comprises storing the modified configuration as a snapshot.

4. The computer program product of claim 1, wherein the storing, in place of the initial configuration, the modified configuration of the virtual machine comprises storing a set of configuration differences of the modified configuration compared to the initial configuration.

5. The computer program product of claim 1, wherein the storing the modified configuration of the virtual machine comprises storing the modified configuration in the storage space.

6. The computer program product of claim 1, further comprising selecting the configuration to be applied when re-starting the virtual machine from the initial configuration and available modified configurations.

7. The computer program product of claim 6, wherein the selecting the configuration to be applied when re-starting the virtual machine comprises verifying the persistent runtime configuration setting and selecting the configuration to be applied when re-starting the virtual machine in case indicated by the persistent runtime configuration setting.

8. The computer program product of claim 6, wherein the configuration comprises individual configuration elements and the selecting the configuration to be applied comprises removing or modifying at least one individual configuration element of the selected configuration or adding an individual configuration element of at least one not selected configuration.

9. The computer program product of claim 8, further comprising storing the configuration to be applied.

10. The computer program product of claim 1, wherein the modifying the persistent runtime configuration setting comprises verifying an authorization to modify the persistent runtime configuration setting.

11. The computer program product of claim 1, further comprising defining a modified configuration as the initial configuration.

* * * * *